Patented June 10, 1930

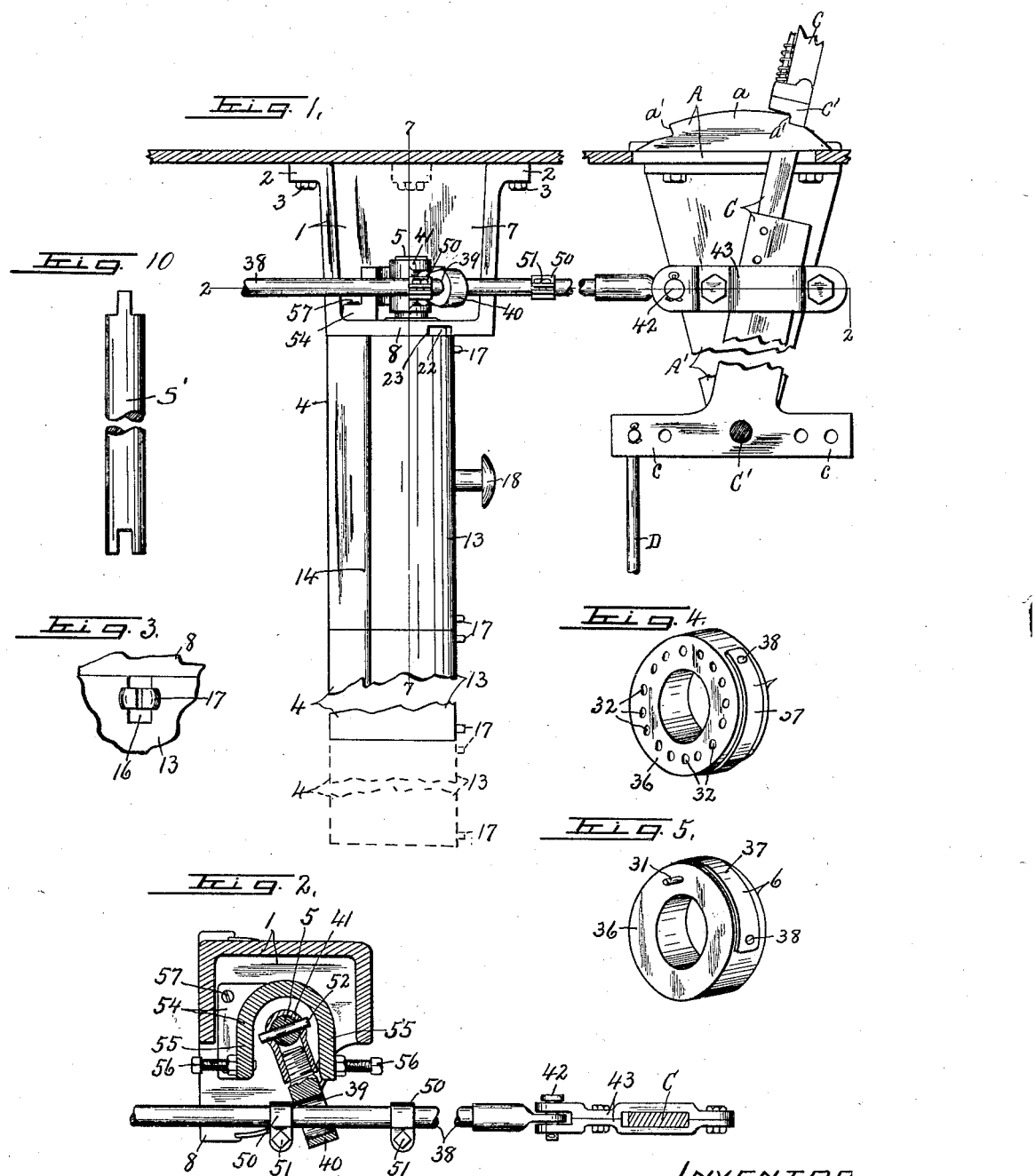

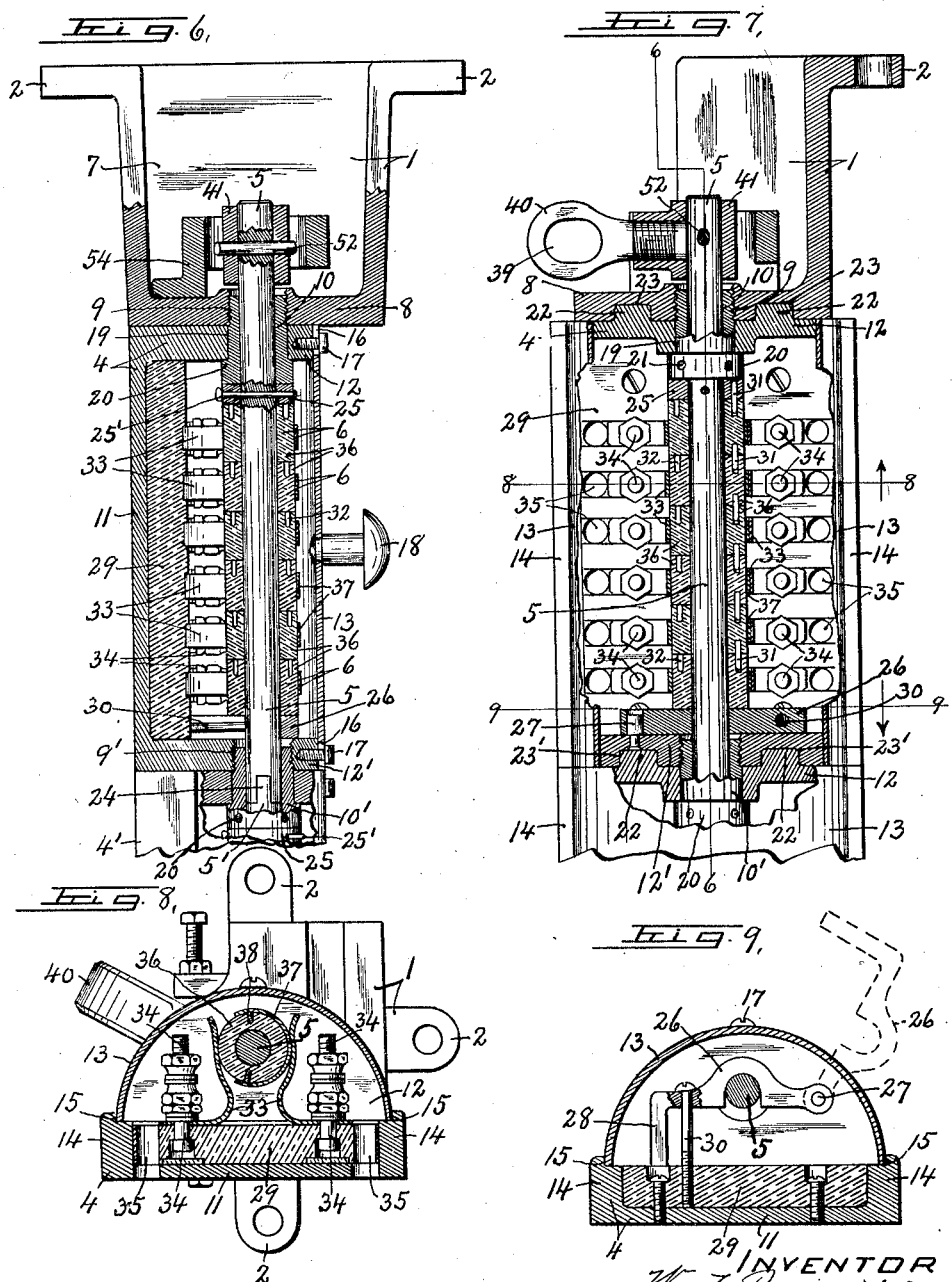

1,762,141

UNITED STATES PATENT OFFICE

WILLIAM F. BOSSERT AND WILLIAM R. BURKE, OF UTICA, NEW YORK, ASSIGNORS TO SIGNAL ACCESSORIES CORPORATION, OF UTICA, NEW YORK, A CORPORATION OF NEW YORK

CIRCUIT CONTROLLER FOR MECHANICAL INTERLOCKING MACHINES

Application filed March 26, 1928. Serial No. 264,792.

This invention relates to a circuit controller for mechanical interlocking machines for railway switch and signal towers and analogous super-structures in which a system of hand levers for controlling the various switches and electric signals are mounted upon the floor of the tower to extend through suitable openings therein below the floor, and the main object of the present invention is to provide a corresponding number of circuit controllers, one or more for each lever, mounted upon the underside of the floor to extend downwardly therefrom so that they may be connected to their respective levers by mechanism wholly below the floor where they are concealed from view and out of the way of the operator and occupants of the tower.

Another object is to provide a circuit controller unit with a multiplicity of commutator switches arranged end to end about a common axis and operatively connected to its operating lever to permit the angular adjustment of all of the switches simultaneously.

A further object is to construct the circuit closer units in such manner that they may be added to or subtracted from the top downwardly by simply attaching them together end to end in sequence without disturbing the first unit of the series or its connections with the operating lever.

Another object is to enable each commutator switches of each unit to be adjusted angularly to different positions about its axis relatively to the other commutator switches so as to vary the relative periods of closing and opening of the switches and also permitting any one or more of the switches of the unit to be adjusted to remain neutral while the others may be active at the same or varying periods of closing and opening.

A further object is to provide the connection between each circuit closing unit and its operating lever with adjustable means for limiting the angular movement of the commutator switches in reverse directions or to their circuit closing and circuit opening positions.

Other objects and uses relating to specific parts of the apparatus will be brought out in the following description.

In the drawings:—

Figure 1 is a side elevation of one of the complete circuit controller units together with its supporting means and operating means and a section of the tower floor to which the supports for the hand levers and circuit controller unit are secured, showing also a portion of a second circuit controller unit, partly broken away, and a portion of a third controller unit by dotted lines.

Figure 2 is a horizontal sectional view taken in the plane of line 2—2, Figure 1.

Figure 3 is a fragmentary face view of a portion of the upper end of the housing for one of the units, showing the manner of securing the movable plate in operative position.

Figures 4 and 5 are perspective views of detached commutator rings carrying the switch segments and showing more particularly the means for interlocking engagement and relative angular adjustment of adjacent commutator rings.

Figure 6 is a vertical sectional view taken in the plane of line 6—6, Figure 7.

Figure 7 is an enlarged vertical sectional view taken in the plane of line 7—7, Figure 1.

Figures 8 and 9 are horizontal sectional views taken respectively in the planes of lines 8—8 and 9—9, Figure 7.

Figure 10 is an elevation of one of the detached shaft sections for the additional circuit controller units.

In order that the invention may be clearly understood we have shown a cast metal frame —A— as mounted upon and secured to the floor as —B— of a switch-and-signal tower to extend downwardly therefrom for receiving and supporting a multiplicity or system of hand levers —C— which extend through an opening in the floor and are pivoted at their lower end at —C'— to the downwardly extending arms —A'— of the frame —A— as shown in Figure 1, each lever being movable independently of the other and provided at its lower end with forwardly and rearwardly extending arms —c—.

Each of the arms —c— is adapted to carry one or more downwardly extending rods —D— for effecting the operation of one or more switches or signals, not shown, as the lever —C— is rocked in reverse directions, said lever being provided with the usual pawl or detent —c'— movable along an arcuate rack —a— having teeth —a'— cooperating with the detent —c'— for holding or locking the lever in different positions of adjustment.

Each lever is adapted to control a multiplicity of electric signals or other electric translating devices in addition to its other function of controlling the operation of mechanical switches and signals and for this purpose is operatively connected to a circuit controller comprising one or more similar and interchangeable units which may be sequentially added to or subtracted from without disturbing the first unit of the series or its connection with its corresponding operating lever, each unit including a definite number of commutator switches operatively connected to each other for simultaneous angular movement and each switch serving to control one or more electric translating devices in the corresponding circuit.

These circuit controller units are mounted upon the underside of the tower floor —B— and their respective commutator shafts are operatively connected to the corresponding levers by horizontal connections located below the tower floor —B— in a plane between the lever pivots —C'— and underside of the floor so that the entire system of circuit controllers and connections with their respective levers will be concealed beneath the floor out of the way of the operators and, therefore, more or less protected against accidental displacement from their adjusted positions.

The circuit controller forming the subject matter of this invention comprises a hollow upright bracket —1— having its upper end provided with out-turned apertured lugs —2— for receiving suitable clamping bolts —3— by which it is secured to the underside of the floor —B— to extend downwardly therefrom for receiving and supporting one or more upright switch housings —4— and a corresponding number of commutator shaft sections —5— each shaft section being adapted to receive and support a multiplicity of, in this instance six, commutator rings —6— controlling an equal number of electric translating devices, not shown, but of any conventional construction commonly used in railway signaling systems and not necessary to herein illustrate or describe for the reason that these translating devices form no part of the present invention except in combination with the circuit controllers.

The bracket —1— is provided with an inner chamber —7— open at one side but closed at the bottom by a bottom wall —8— having a central threaded opening —9— for receiving a bushing —10— which also serves as a journal bearing for the shaft —5— and as a means for securing the housing section —4— to the underside of the bracket —1— in a manner presently described.

Each of the housing sections —4— is substantially U-shaped in that it comprises an upright base portion —11— and upper and lower and flanges —12— and —12'— projecting in the same direction from the base portion —11— in vertically spaced parallel relation and having their outer marginal edges substantially semi-circular in form in top plan for receiving and supporting a similarly formed cover plate —13—.

The opposite upright edges of the base portion —1— are provided with forwardly projecting flanges —14— having grooves —15— for receiving the adjacent edges of the cover plate —13— to assist in holding said cover plate against lateral displacement.

The lower and upper ends of the cover plate resting upon the outer edges of the flanges —12— and —12'— are provided with vertically elongated slots —16— in vertical alinement along the longitudinal center of the plate for receiving clamping screws —17— which are engaged in threaded apertures in the adjacent portions of the flanges —12— and —12'— and are provided with suitable heads of slightly less width in one direction than the widths of their corresponding slots 16, but of greater width in the opposite direction than said slots so that when turned at right angles to the slots they will hold the plate in operative position or, on the other hand, when turned lengthwise of the slots, will permit the plate to be removed, said plate being provided with a central handle —18— by which it may be conveniently removed and replaced.

The bracket section —1— and adjacent housing section —4— are secured together end to end vertically and for this purpose the upper flange —12— is provided with a vertical opening —19— registering with the threaded opening —9— in the bottom of the bracket —1— for receiving the bushing —10— which is passed loosely through the opening —19— and engaged with said threaded opening —9— and has its lower end enlarged at —20— to engage the underside of the flange —12— for firmly clamping it to the underside of the bracket —1— said head —20— being provided with peripheral sockets —21— for receiving a spanner wrench or equivalent tool by which the bushing may be tightened and loosened.

Suitable means is provided to prevent turning of the housing section —4— about the axis of the bushing —10— and for this purpose the upper face of the housing section is provided with raised ribs —22— located at opposite sides of the axis of the bushing and engaged in corresponding grooves —23— in the underside of the bracket —1— as shown more clearly in Figure 7.

The lower flange —12'— of the housing section —4— is provided with a threaded opening —9'— similar to the threaded opening —9— in the bottom of the bracket —1— for receiving a threaded bushing —10'— similar to the bushing —10— and serving a similar purpose for clamping the upper end of a similar additional housing —4'— to the underside of the section —4—.

This bushing —10'— also serves as a journal bearing for the lower end of the shaft section —5— and for the upper end of a similar coaxial shaft section —5'— carried by the housing section —4'—.

The means for holding the housing section —4'— against turning movement on the bushing —10'— is similar to that previously described for holding the section —4— against turning movement relatively to the bracket —1— in that the lower face of the flange —12'— is provided with grooves —23'— arranged in the same relation to the axis of the bushings —10— and —10'— as the grooves —23— for receiving the ribs —22— on the upper flange —12— of the next adjacent lower housing section —4'— which is exactly like the section —4— and interchangeable therewith.

This similarity of construction of the housing sections permits the use of an indefinite number thereof arranged end to end in vertical alinement and secured to each other by bushings similar to the bushings —10— and —10'— which are also identical in construction and interchangeable.

The upper end of the shaft section —5— extends through and some distance above the bushing —10— and bottom —8— of the bracket —1— for connection with the corresponding lever —C— in a manner hereinafter described, the lower end of the shaft being extended approximately half way through the lower bushing —10'— where it is splined to the upper end of the shaft section —5'— by means of a tongue and groove connection —24— as shown more clearly in Figure 6, for transmitting motion from one shaft section to the other, it being understood that all of the shaft sections —5'— for any additional circuit closer units will be identical in that the opposite ends of each will be formed respectively with a tongue —24— and corresponding groove so that when the units are assembled end to end the angular movement of any one of the shafts as —5— will transmit similar movement to the remaining shaft sections.

Each of the shaft sections as —5— or —5'— is provided with a collar —25— secured thereto by a key or pin —25'—, Figure 6, to abut against the lower end of the corresponding bushing —10— or —10'— and also to form stops for limiting the upward movement of the corresponding commutator rings —6— and for a further purpose, presently described.

Each of the housing sections —4— is provided near its lower end with a movable abutment —26—, Figure 9, movable to and from a position between the lower face of the lower commutator ring —6— and upper face of the lower flange —12'— and for this purpose is hinged at one end at —27— to the flange —12'— and at its other end provided with an offset stop arm —28— adapted to engage the inner face of an insulating block as —29— within the section —4—.

This movable abutment —26— is held in its operative position by a clamping screw or bolt —30— engaged in a threaded aperture in the insulating block —29—, as shown in Figure 9.

The collar —25— and each of the commutator rings —6— except the lowermost ring is provided with a clutch pin as —31—, Figure 5, projecting downwardly from the lower face thereof and adapted to enter any one of a circumferential series of apertures or sockets —32— in the adjacent end faces of the rings, as shown in Figure 4, to lock said rings to each other for simultaneous angular movement, the axial length of the pin being relatively short as compared with the axial length of the rings or just sufficient to establish positive interlocking engagement with each other and with the collar —25—.

The axial width of the movable abutment —26— is sufficiently greater than the axial length of each of the clutch pins —31— so that when the abutment is displaced from its operative position to the position shown by dotted lines in Figure 9 the commutator rings may be adjusted axially and downwardly to disconnect the pins from the sockets and thus permit relative angular movement of anyone of the rings independently of the others for the purpose of varying the period of closing and opening of the corresponding switches and also to permit either switch to be adjusted to a neutral or inactive position, if desired, while the remaining switches may be opened and closed at the same or at different periods.

The insulating block —29— is seated against the inner face of the upright base portion —11— of the housing section —4— between the end flanges —12— and —12'— and also between the lengthwise flanges —14—, as shown more clearly in Figures 6, 8 and 9, for receiving and supporting a plurality of pairs of spring switch terminals —33—, one pair of each of the commutator rings —6—.

The terminals of each pair are spring-pressed against opposite sides of the periphery of its corresponding commutator ring —6— and are secured by binding posts —34— to the insulating base —29—.

The binding posts —34— are adapted to receive circuit wires leading therefrom through openings —35— to the particular translating device or devices to be operated by the closing of the commutator switch, but not necessary to herein show or describe.

Each commutator ring comprises a cylindrical collar —36— of insulating material and a peripheral contact segment —37— of electric conducting material secured thereto by screws —38— or equivalent fastening means to extend circumferentially slightly more than half the circumference of the sleeve —36— so as to establish electrical contact with both of its terminals —33— when adjusted to a certain position and at the same time leaving sufficient insulating space between the ends of the segment to break contact with at least one of the terminals when adjusted to another position.

As previously stated, the upper collar —25— is fastened to the shaft section —5— and is normally in clutch connection with the adjacent insulating sleeve —36— which together with the remaining insulating sleeves are normally in clutch connection with each other so that any angular movement of the shaft —5— will be transmitted to the several insulating sleeves —36— and contact segments —37— carried thereby for the purpose of opening and closing the several circuits represented by the several segments and their corresponding terminals.

That is, each segment —37— and its corresponding pair of terminals —33— constitute what may be termed a commutator switch controlled by the angular movement of the shaft —5—.

Suitable means is provided for transmitting motion from the hand lever —C— to the commutator shaft —5—, said means consisting, in this instance, of a horizontal extending rod —38— located in the horizontal plane of the upper end of the shaft —5— and intermediate portion of the lower end of the lever —C— between its pivot —C'— and underside of the floor —B— whereby the operating mechanism will be concealed beneath the floor out of the way of the operator.

The rod —38— extends loosely through an opening —39— in a yoke —40— which is provided with a reduced threaded end engaged in a threaded aperture or socket of a collar —41— on the upper end of the shaft —5—, as shown more clearly in Figures 6 and 7.

The front end of the rod is pivotally connected at —42— to the rear end of a clamping link —43— which is mounted on the lever —C— between the pivot —C'— and underside of the floor, as shown in Figure 1, whereby the movement of the lever in reverse directions about its pivot will cause a similar endwise reciprocatory movement of the rod —38— in the slot or opening —39—.

The rod —39— is provided with shoulders —50— at opposite sides of the yoke —40— in spaced relation thereto and adjustable lengthwise of said rod to permit a limited endwise movement of the rod in advance of the engagement of either of the shoulders —50— with the yoke member —40—.

These stops —50— are preferably made in the form of clamps or split collars having bolts —51— by which they may be frictionally clamped to the rod —38— to hold them in their adjusted position.

The object in spacing these stops —50— from opposite sides of the yoke —40— is to permit the lever —C— to be operated from one extreme position to the other to effect the shifting of the switch or other mechanical signal and to limit the angular movement of the circuit-controlling segments during this operation of the lever.

The collar —41— is secured to the shaft section —5— by means of a key or pin —52— or equivalent fastening means and together with the yoke member —40— constitutes what may be termed a crank arm in which the section —40— is adjustable radially in the threaded socket of the collar —41— to aline its opening —39— with the rod —38—.

Additional means is provided for limiting the angular movement of the shaft section —5— and commutator segments carried thereby, said means consisting, in this instance, of a cast metal plate —54— extending around diametrically opposite sides of the collar —41— and provided with opposite arms —55— projecting along opposite sides of the crank arm and provided with stop screws —56— adapted to be adjusted toward and from the crank arm to stop the oscillation of the same to different positions as may be required to limit the angular adjustment of the commutator switch segments relatively to their respective terminals —33—.

The plate —54— is secured to the upper face of the bottom of the bracket —1— by screws —57— or equivalent fastening means shown in Figure 2.

It is now evident that each housing section —4— and shaft section —5—, together with the several commutator switches mounted on the shaft section and their cooperative terminals —33— mounted on the insulating block —29— constitute a complete circuit collar unit and that any number of these units may be secured to each other from the top downwardly by means of their respective bushings —10— or —10'— or may be interchanged one for the other so that the number of translating devices controlled by a single operating lever as —C— may be added to or substracted from by simply increasing or diminishing the number of units, all of which will extend from the underside of the floor downwardly where ample space for the additional units is available without in any way interfering with the freedom of movement of the operator on the surface of the floor —B—.

*Operation*

In the position of the switch levers —C— as shown in Figure 1 the several segments as —37— of the commutator switches will be out of electrical contact with the terminals at one side of the shaft —5— while maintaining contact with the terminals at the opposite side so that if the lever —C— is moved forwardly from the position shown to its other extreme position the intermediate shoulder —50— will engage and operate the crank arm —40— to rock the shaft —5— and commutator rings carried thereby to cause the engagement of the segments —27— with the corresponding terminals of each pair for closing the circuits to the several translating devices, not shown, but connected in said circuits.

If more than one of the circuit controlling units is employed motion will be transmitted from the shaft —5— to the corresponding shafts of the additional units to effect a simultaneous operation of the latter for controlling additional translating devices.

If it is desired to render any one of the commutator switches inactive or neutral the movable abutment —26— may be released and rocked from the position shown by full lines in Figure 9 to the position shown by dotted lines whereupon the several commutator rings may be moved axially out of clutch engagement with each other to permit either to be adjusted rotarily relatively to the others to bring its commutator segment into the desired relation to the terminals after which the clutch engaging ends of the commutator rings may be reengaged and the locking member —26— restored to its locking position for holding the commutator rings against further endwise movement ready for further operation.

What I claim is:

1. In a circuit controller of the character described, an upright support, an upright shaft mounted on the support for angular movement, a multiplicity of electric switch terminals mounted on the support in sequence along the shaft, a multiplicity of commutator rings loosely mounted end to end upon the shaft for axial displacement therefrom and provided with contact segments movable into and out of contact with the terminals as the shaft is moved angularly, the meeting ends of the commutator rings being provided with clutch-engaging members for transmitting angular motion from one to the other, said commutator rings being adjusted axially to disengage the clutch members and to permit angular movement of each of the rings independently of and relatively to the others, a collar secured to the shaft and having clutch engagement with the uppermost commutator rings, an abutment movable into and out of engagement with the lower face of the lowermost commutator ring to hold said rings in clutch engagement with each other and the uppermost ring in clutch engagement with the collar and to permit axial adjustment of said rings independently of the collar and means for effecting angular movement of the shaft.

2. In a circuit controller for mechanical interlocking machines for railway switch and signal towers, a circuit-controller support mounted on the underside of the floor to extend downwardly therefrom, an upright shaft journaled on the support for angular movement, a multiplicity of electric switch terminals mounted on the support along the shaft, a crank arm secured to the upper end of the shaft and provided with an opening therethrough, a rod slidable endwise through the opening in the crank arm, stops secured to the rod in axially spaced relation at opposite sides of the crank arm for engaging and operating the crank arm to effect the angular movement of the shaft as the rod is moved endwise in reverse directions, and a multiplicity of contact segments operatively mounted on the shaft for angular movement therewith into and out of contact with said terminals.

3. In a circuit controller of the character described, a plurality of similar upright supports arranged end to end, vertically alined bushings connecting adjacent ends of the supports, upright shaft sections journaled end to end in said bushings and provided with detachable interlocking connections between adjacent ends for transmitting angular motion from one to the other, a machine lever, means for transmitting motion from said lever to the upper shaft section, each support having a separate series of electric switch terminals arranged in sequence lengthwise of its corresponding shaft section, each shaft section having a separate series of commutator rings movable angularly therewith and provided with contact segments movable into and out of engagement with the contact terminals.

4. In a circuit controller of the character described, a plurality of similar circuit controller units detachably connected end to end and each including a multiplicity of commutator rings and separate supporting shafts therefor having their adjacent ends detachably interlocked one with the other for simultaneous angular movement, a machine lever, and means for transmitting motion from said lever to one of the shaft sections.

5. In a circuit controller of the character described, a hanger and an upright housing arranged end to end, a bushing connecting the meeting ends, an upright shaft journaled in said bushing for angular movement, means for effecting the angular movement of the shaft, a multiplicity of pairs of electric switch terminals mounted in the housing lengthwise of the shaft, a multiplicity of commutator rings mounted end to end upon the shaft between the bushings for angular movement therewith and provided with contact segments for engagement with said terminals.

6. In a circuit controller of the character described, an upright hanger, an upright housing section having its upper end abutting against the lower end of the hanger, a bushing connecting the adjacent ends of the hanger and housing, an additional bushing secured in the lower end of the housing section in vertical alinement with the first-named bushing, an upright shaft journaled in said bushings for angular movement, a multiplicity of pairs of electric switch terminals mounted within the housing lengthwise of the shaft, a multiplicity of commutator rings mounted end to end upon the shaft for angular movement therewith and provided with peripheral contact segments for contact with said terminals, and means for effecting angular adjustment of the shaft.

7. A circuit controller as in claim 5 in which the adjacent end faces of the hanger and housing section are provided with interlocking tongue and groove connections to hold them against relative turning movement about the axis of the shaft.

8. In a circuit controller of the character described, a plurality of similar upright housing sections detachably connected end to end, upright shaft sections, one for each housing section and each journaled in its corresponding housing section, said shaft-sections having their adjacent ends detachably interlocked with each other for simultaneous angular movement, means connected to the upper end of the upper shaft section for effecting said angular movement, each housing section containing a multiplicity of pairs of electric switch terminals, the number of pairs of each housing being equal, each shaft being provided with a multiplicity of commutator rings having contact segments for engaging corresponding pairs of terminals, the number of commutator rings for each shaft section being equal.

9. In a circuit controller of the character described, an upright housing having vertically spaced bearings, a shaft journaled in said bearings and provided with a collar rigid thereon near the upper bearing, a series of commutator rings loosely mounted end to end upon said shaft and having their adjacent ends provided with interengaging clutch members for transmitting rotary motion from one ring to the other, the adjacent ends of the upper ring and collar having interengaging clutch members for transmitting rotary motion from the collar to the rings, and a detent normally engaging the lowermost ring for holding said rings against downward displacement, said detent being displaceable from its normal position to permit the rings to be displaced axially from clutch engagement with each other and with said collar.

In witness whereof we have hereunto set our hands this twelfth day of March, 1928.

WILLIAM F. BOSSERT.
WILLIAM R. BURKE.